United States Patent [19]

Shelby et al.

[11] 4,126,058
[45] Nov. 21, 1978

[54] FLUID FLOW DIVIDER

[75] Inventors: Robert L. Shelby, Chillicothe, Ill.;
Delbert G. Nelson, West Bountiful,
Utah

[73] Assignee: Caterpillar Tractor Co., Peoria, Ill.

[21] Appl. No.: 816,578

[22] Filed: Jul. 18, 1977

[51] Int. Cl.$^2$ ............................................. F16H 57/02
[52] U.S. Cl. ............................ 74/606 R; 137/561 A;
192/112
[58] Field of Search ................ 74/606 R, 607, 606 A;
192/112; 73/273, 274; 285/132; 137/561 A

[56] References Cited

U.S. PATENT DOCUMENTS

| | | | |
|---|---|---|---|
| 1,425,094 | 8/1922 | Hudson | 74/606 |
| 1,631,472 | 6/1927 | Clark | 73/273 |
| 1,752,631 | 4/1930 | Campbell | 285/132 X |
| 2,295,832 | 9/1942 | Chedister | 285/132 X |
| 2,681,029 | 6/1954 | Canazzi | 74/606 X |
| 2,687,784 | 8/1954 | Klackner | 74/606 A |
| 3,001,544 | 9/1961 | Fergason | 137/262 |
| 3,082,645 | 3/1963 | Chiarello | 74/606 |
| 3,262,466 | 7/1966 | Adams et al. | 137/561 A X |
| 3,363,477 | 1/1968 | Curtiss et al. | 74/606 X |
| 3,686,973 | 8/1972 | Davison, Jr. et al. | 74/606 R |
| 3,864,938 | 2/1975 | Hayes, Jr. | 137/561 A |
| 3,874,183 | 4/1975 | Tabet | 74/606 A |
| 4,016,033 | 4/1977 | Schiel et al. | 137/561 A |

FOREIGN PATENT DOCUMENTS

| | | | |
|---|---|---|---|
| 122,810 | 11/1946 | Australia | 73/274 |
| 74,392 | 4/1954 | Netherlands | 137/561 A |

*Primary Examiner*—Leslie Braun
*Attorney, Agent, or Firm*—Wegner, Stellman, McCord, Wiles & Wood

[57] ABSTRACT

A fluid flow divider such as for use in controlling fluid flow in a power transmission mechanism. Illustratively, the flow divider may be utilized for providing connection to a bevel gear case provided with a plurality of fluid flow passages opening through a wall portion thereof. The flow divider includes first connecting structure for connecting a first fluid flow conduit to the wall portion to have fluid flow communication with one of the flow passages through its opening in the wall portion. The flow divider further includes a second connecting structure for connecting a second fluid flow conduit to a wall portion to have fluid flow communication with a plurality of additional ones of the fluid flow passages concurrently through their respective openings in the wall portion. Seals are provided for sealing the flow divider to the wall portion. The second connecting structure may include a removable connecting member secured to a cover member in turn secured to the wall portion.

8 Claims, 3 Drawing Figures

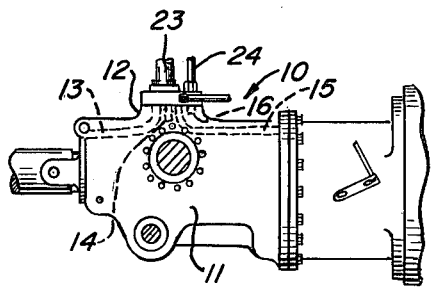
FIG. 1
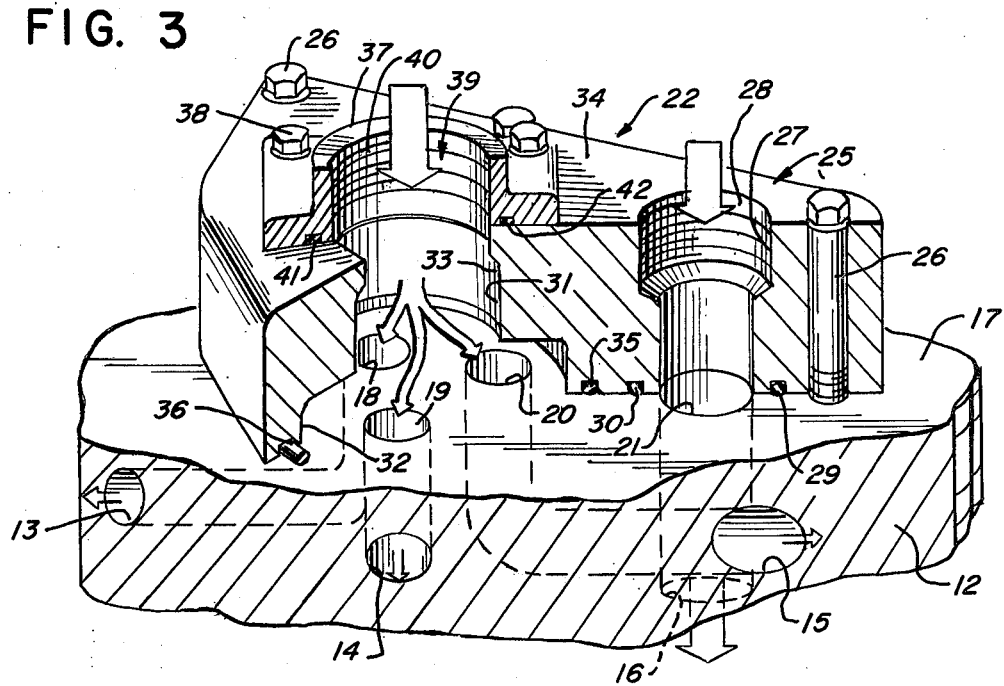
FIG. 3
FIG. 2

FLUID FLOW DIVIDER

BACKGROUND OF THE INVENTION

1. Field of the Invention

This invention relates to power transmission mechanisms and in particular to means for providing fluid flow connection to flow passages therein.

2. Description of the Prior Art

In making connections to the flow passages provided in portions of power transmission mechanisms, such as the bevel gear case of such a mechanism, it has been conventional to provide removable connectors for sealingly connecting the individual conduits to the individual flow passages in the case.

A number of the flow passages in the case may require connection to a single external conduit and, thus, it has been conventional to provide an external manifold or the like to which conduits from the respective plurality of flow passages may be connected and to which a single delivery conduit may be connected.

SUMMARY OF THE INVENTION

The present invention comprehends an improved fluid connection means for use in a power transmission mechanism or the like having a case provided with a plurality of fluid flow passages opening through a wall portion thereof.

The connecting means of the present invention includes a first connecting means for sealingly connecting a first fluid flow conduit to the wall portion of the mechanism case to have fluid flow communication with one of the flow passages through its opening in the wall portion. Additionally, a second connecting means is provided for connecting a second fluid flow conduit to the wall portion to have fluid flow communication with a plurality of additional ones of the fluid flow passages in the mechanism case concurrently through the openings there in the wall portion thereof.

Sealing means are provided for sealing the connecting means to the wall portion about the one fluid flow passage and about the plurality of additional fluid flow passage openings.

The connecting means may be defined by a connecting member removably secured to the case wall portion. In the illustrated embodiment, a cover member is further removably secured to the connecting member to cooperate therewith in defining the second connecting means. The connecting member may be sealed to the cover member by a suitable third seal.

The cover member may be secured to the case wall portion by suitable bolts and the connecting member may be connected to the cover member by suitable bolts.

Thus, the improved power transmission mechanism fluid flow connecting means is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary side elevation of a power transmission mechanism having a fluid flow connecting means embodying the invention;

FIG. 2 is a fragmentary enlarged top plan view thereof; and

FIG. 3 is a fragmentary enlarged sectional perspective taken substantially along the line 3—3 of FIG. 2.

DESCRIPTION OF THE PREFERRED EMBODIMENT

In the exemplary embodiment of the invention as disclosed in the drawing, a power transmission mechanism generally designated 10 illustratively comprises a bevel gear mechanism having a case 11 defining a wall portion 12 having a plurality of fluid flow passages, such as passages 13, 14, 15 and 16, opening through an outer surface 17 of the wall portion 12 through openings 18, 19, 20 and 21, respectively.

As shown in the drawing, a connecting means generally designated 22 is provided for connecting a first conduit 23 and a second conduit 24 to different ones of the flow passages.

More specifically, conduit 23 may be connected concurrently to each of the flow passages 13, 14, and 15, and conduit 24 may be connected to the flow passage 16 by the connecting means 22. To provide such selective connection, the connecting means includes a cover member 25 removably secured to the outer surface 17 of the wall portion 12 by suitable removable means, such as bolts, 26. The cover member is provided with a first fluid flow passage 27 aligned with opening 21 in the wall portion 12 and having an outer threaded end 28 for threadedly receiving the corresponding threaded end of the conduit 24. The cover member may be provided with an annular groove 29 receiving a suitable sealing O-ring 30 for sealing the cover member to the surface 17 about the opening 21 and lower end of passage 27.

Cover member 25 further defines a second flow passage 31 overlying each of the openings 18, 19 and 20 in surface 17. As best seen in FIG. 3, flow passage 31 includes a lower portion 32 having a relatively large diameter and defining a chamber having concurrent communication with each of the openings 18, 19 and 20. The flow passage 31 further defines an upper portion 33 opening through an upper surface 34 of the cover member.

The cover member is provided with a downwardly opening groove 35 concentrically outwardly of the passage portion 32 and provided with a suitable annular O-ring seal 36 for sealing the cover member to the wall portion surface 17 about the plurality of openings 18, 19 and 20 and passage portion 32.

Connecting means 22 further includes a connecting member 37 removably secured to the upper surface 34 of the cover member 25 by threaded securing means, such as bolts 38. Connecting member 37 defines a through flow passage 39 aligned with end 33 of flow passage 31 and having a threaded upper portion 40 for threaded connection thereto of the conduit 23. The connecting member may be provided with a downwardly opening groove 41 provided with a suitable O-ring seal 42 for sealing the connecting member to the upper surface 34 of the cover member 25 concentrically about the passage 40.

Thus, the connecting means 22 defines a first portion sealingly connecting the first conduit 24 to the flow passage 16 in the wall portion 12, and a second portion sealingly connecting the conduit 23 concurrently to each of the flow passages 18, 19 and 20 therein. The connecting means may comprise a cover member removably secured to the wall portion 12 and a connecting member removably secured to the cover member.

Suitable sealing means are provided for sealing the cover member to the wall portion 12 about the plurality of openings 18, 19 and 20, and for sealing the connecting member to the cover member about the single flow passage means therebetween.

As shown in FIG. 2, flow passages 39 and 31 are coaxially centered relative to the array of flow passages 18, 19 and 20 so as to provide an equal dispersion of fluid flow between the openings 18, 19 and 20.

Cover member 25 is arranged to cover the openings of the flow passages in the wall portion 12 and selectively provide fluid flow communication either individually or to groups of the wall portion flow passages. The use of the improved connecting means 22 permits the elimination of the relatively costly elbows, T-fittings, etc., of the prior art heretofore provided for interconnecting the plurality of flow passages in the mechanism case.

The foregoing disclosure of specific embodiments is illustrative of the broad inventive concepts comprehended by the invention.

The embodiments of the invention in which an exclusive property or privilege is claimed are defined as follows:

1. In a power transmission mechanism having a case provided with a plurality of fluid flow passages opening through a wall portion thereof in a plurality of distributed axially parallel openings, the improvement comprising:

connecting means for connecting a fluid flow conduit to said wall portion and defining a through passage providing substantially direct fluid flow communication between said fluid flow conduit and said openings in said wall portion, said through passage having upper and lower portions, the cross section of said lower portion being larger than the portion of the case through which said openings extend to permit a portion of the fluid flow to pass indirectly from the portion of the enlarged lower portion of the through passage outwardly of said openings into said openings, said upper portion overlying at least a portion of each of said openings and having a cross section smaller than that of said lower portion, said connecting means including a cover member removably secured to said wall portion and a connecting member removably secured to said cover member cooperatively defining a chamber having fluid flow communication with all of said plurality of openings;

first sealing means sealing the connecting means to said wall portion outwardly of and about said plurality of fluid flow passage openings; and second sealing means sealing the connecting member to said cover member about said through passage.

2. The power transmission mechanism of claim 1 wherein said connecting member is secured to said cover member by a plurality of bolt means extending through said connecting member and threaded to said cover member outwardly of said second sealing means.

3. In a power transmission mechanism having a case provided with a plurality of fluid flow passages opening through a wall portion thereof in a plurality of distributed axially parallel openings, the improvement comprising:

connecting means for connecting a fluid flow conduit to said wall portion and defining a through passage providing substantially direct fluid flow communication between said fluid flow conduit and said openings in said wall portion, said through passage having upper and lower portions, the cross section of said lower portion being larger than the portion of the case through which said openings extend to permit a portion of the fluid flow to pass indirectly from the portion of the enlarged lower portion of the through passage outwardly of said openings into said openings, said upper portion overlying at least a portion of each of said openings and having a cross section smaller than that of said lower portion; and sealing means sealing the connecting means to said wall portion outwardly of and about said plurality of fluid flow passage openings.

4. The power transmission mechanism of claim 1 wherein said case comprises a bevel gear case.

5. The power transmission mechanism of claim 1 wherein said connecting means comprise a cover member removably secured to said wall portion.

6. The power transmission mechanism of claim 1 wherein said connecting means comprise a cover member removably secured to said wall portion by a plurality of bolt means extending through said cover member and threaded to said wall portion.

7. The power transmission mechanism of claim 1 wherein said connecting means comprises means defining an outwardly opening threaded flow passage for threaded connection of said conduit thereto.

8. The power transmission mechanism of claim 1 wherein said connecting means includes a cover member sealing secured to said case and a connecting member removably sealed to said cover member by a second sealing means.

* * * * *

UNITED STATES PATENT AND TRADEMARK OFFICE
CERTIFICATE OF CORRECTION

PATENT NO. : 4,126,058

DATED : November 21, 1978

INVENTOR(S) : Robert L. Shelby, et al.

It is certified that error appears in the above—identified patent and that said Letters Patent are hereby corrected as shown below:

Column 4, lines 34, 36, 39, 44 and 48, delete "1" and insert "3".

Signed and Sealed this

Seventeenth Day of January 1984

[SEAL]

Attest:

GERALD J. MOSSINGHOFF

*Attesting Officer*  *Commissioner of Patents and Trademarks*